(12) United States Patent  
Morton, III et al.

(10) Patent No.: US 7,365,886 B2
(45) Date of Patent: Apr. 29, 2008

(54) METHOD AND APPARATUS FOR FEEDING A DOCUMENT TO A DEVICE

(75) Inventors: Charles G. Morton, III, Leander, TX (US); Christa Ann Ferguson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 526 days.

(21) Appl. No.: 11/020,807

(22) Filed: Dec. 22, 2004

(65) Prior Publication Data

US 2006/0132865 A1  Jun. 22, 2006

(51) Int. Cl.
  *H04N 1/04* (2006.01)
  *H04N 1/00* (2006.01)
  *H04N 1/23* (2006.01)

(52) U.S. Cl. ............... 358/473; 358/472; 358/496; 358/498; 358/401; 358/296

(58) Field of Classification Search ......... 358/472, 358/473, 496, 498, 474, 401, 501, 505, 296; 382/313, 312; 399/363, 367, 365, 361, 405
See application file for complete search history.

(56) References Cited

U.S. PATENT DOCUMENTS

| 5,270,841 | A | * | 12/1993 | Watanabe | 358/498 |
| 5,379,121 | A | * | 1/1995 | Yamada et al. | 358/400 |
| 5,634,635 | A | | 6/1997 | Kobayashi et al. | |
| 5,973,799 | A | * | 10/1999 | Gatto et al. | 358/498 |
| 6,141,119 | A | * | 10/2000 | Tseng et al. | 358/498 |
| 6,906,830 | B1 | * | 6/2005 | Hayashi | 358/498 |
| 6,934,059 | B2 | * | 8/2005 | Lundgren | 358/498 |

* cited by examiner

*Primary Examiner*—Cheukfan Lee
(74) *Attorney, Agent, or Firm*—Haynes and Boone, LLP (57) ABSTRACT

A document feeding apparatus includes a chassis having a plurality of side surfaces and a substantially level upper surface. A feed mechanism is mounted in the chassis. A document entrance passageway is defined by the chassis and substantially enclosed by the chassis, the document entrance passageway positioned adjacent the feed mechanism and including a document entrance on one of the plurality of side surfaces. A document exit passageway is defined by the chassis and substantially enclosed by the chassis, the document exit passageway positioned adjacent the feed mechanism and including a document exit on one of the plurality of side surfaces.

24 Claims, 8 Drawing Sheets

METHOD AND APPARATUS FOR FEEDING A DOCUMENT TO A DEVICE

BACKGROUND

The present disclosure relates generally to information handling systems, and more particularly to feeding a document to a device.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Printers are often coupled to information handling systems in order to allow the printing, copying, and scanning of documents. Printers typically include an automatic document feeder on their top surface which includes a document feeding/input mechanism in order to automatically supply documents to the printer.

The document feeding/input mechanism on the automatic document feeder results in the top surface of the printer being uneven and unstable, which raises issues with regard to placing devices such as, for example, other information handling system components, on top of the printer. When space limitations are an issue, printers with convention automatic document feeders become impractical. The uneven surface is also not ideal for branding opportunities such as, for example, placing a company logo on the top surface of the printer.

In addition, the document feeding/input mechanism on the automatic document feeder is open to the environment, making the printer vulnerable to substances that might be spilled on top of the printer, or to dust, dirt, or other foreign objects that could enter the printer from the top surface and result in damage to printer components.

Accordingly, it would be desirable to provide for feeding a document to a device absent the disadvantages found in the prior methods discussed above.

SUMMARY

According to one embodiment, a document feeding apparatus is provided that includes a chassis including a plurality of side surfaces and a substantially level upper surface. A feed mechanism is mounted in the chassis. A document entrance passageway is defined by the chassis and substantially enclosed by the chassis, the document entrance passageway positioned adjacent the feed mechanism and including a document entrance on one of the plurality of side surfaces. A document exit passageway is defined by the chassis and substantially enclosed by the chassis, the document exit passageway positioned adjacent the feed mechanism and including a document exit on one of the plurality of side surfaces.

A principal advantage of this embodiment is that the substantially level upper surface on the chassis provides a stable surface for positioning devices on the apparatus, while also providing branding opportunities on the upper surface of the apparatus and sheltering printer components from the environment.

BRIEF DESCRIPTION OF THE DRAWINGS

FIG. 3b is a front view illustrating an exemplary embodiment of the feed mechanism of FIG. 3a.

FIG. 5 is a perspective view illustrating an exemplary embodiment of the assembly of the chassis of FIG. 2a and the feed mechanism of FIG. 3a.

FIG. 7a is a perspective view illustrating an exemplary embodiment of a plurality of documents in the document feeding apparatus of FIG. 6a.

FIG. 10b is a cross sectional view illustrating an exemplary embodiment of the document feeding apparatus of FIG. 10a.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
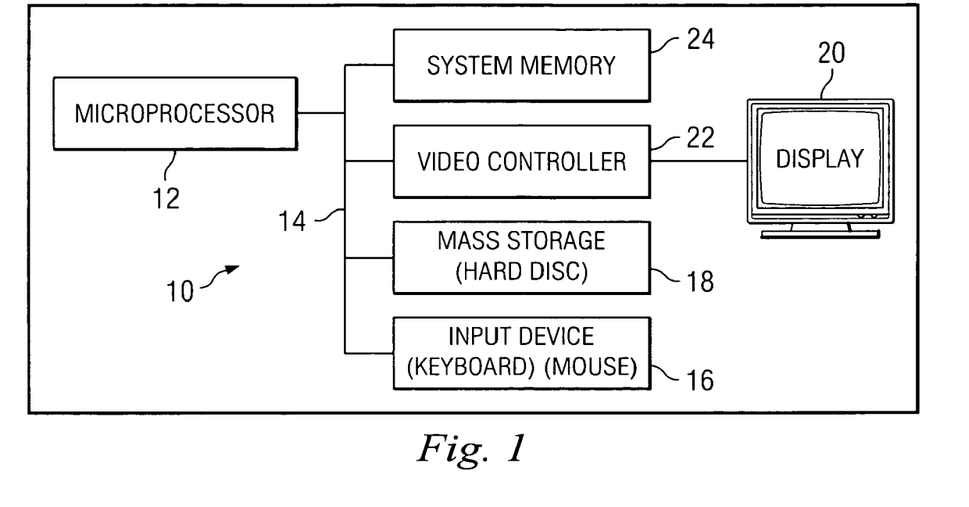
FIG. 1 is a schematic view illustrating an exemplary embodiment of an information handling system.

In one embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2A:
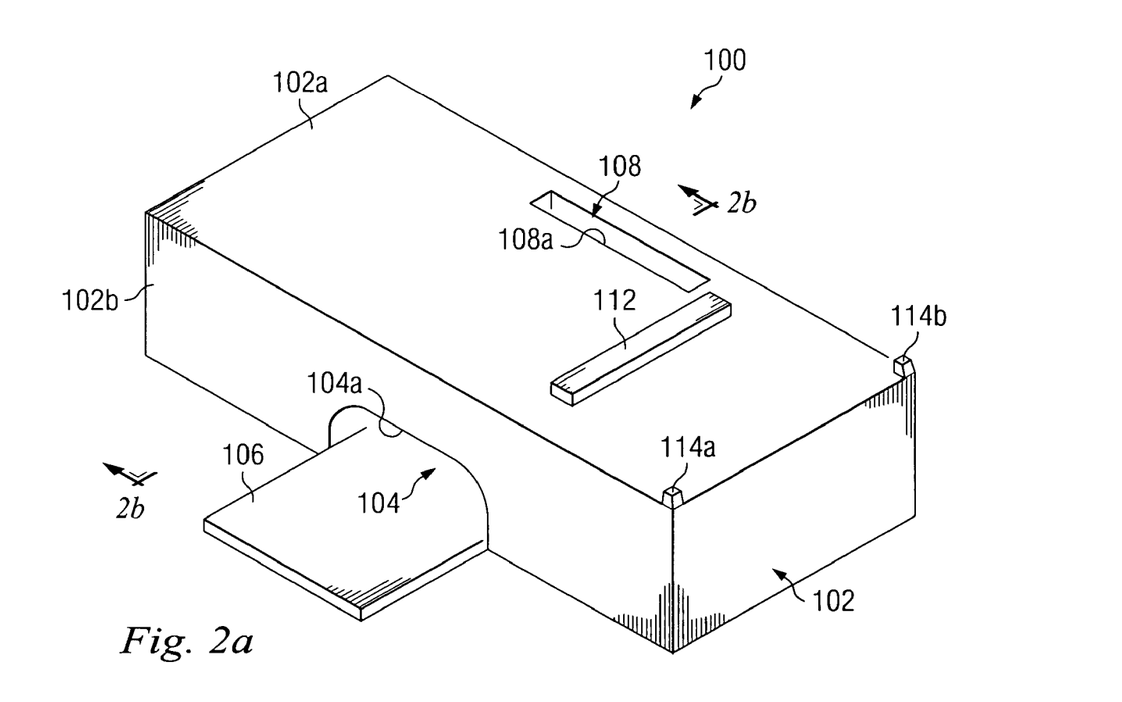
FIG. 2a is a perspective view illustrating an exemplary embodiment of a chassis.
Figure 2B:
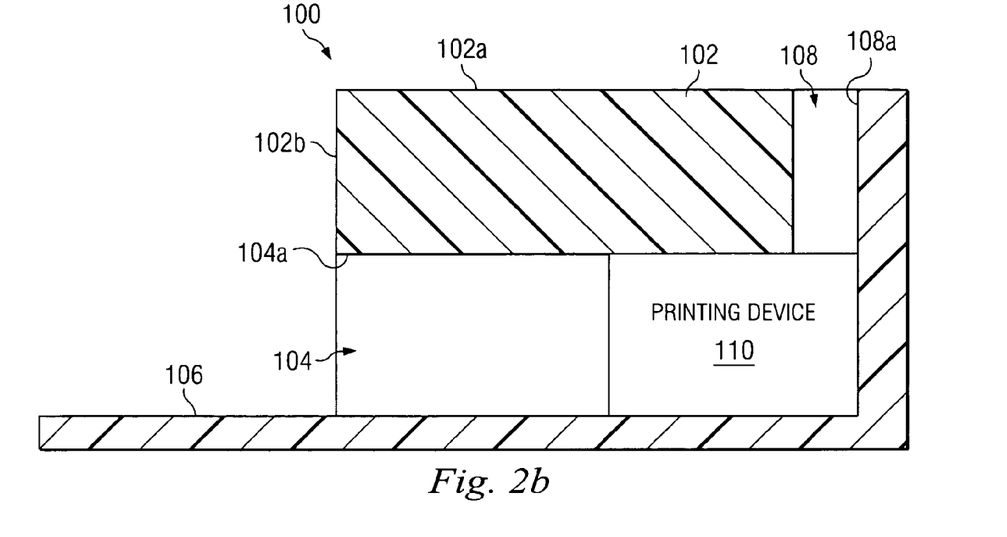
FIG. 2b is a cross sectional view illustrating an exemplary embodiment of the chassis of FIG. 2a taken along line 2b.

Referring now to FIGS. 2a and 2b, a chassis 100 includes an elongated base 102 having an upper surface 102a and a side surface 102b. A printed document passageway 104 is defined by the chassis 100 and includes a printed document exit 104a which provides access to the printed document passageway 104 and which is centrally located on the side surface 102b. A printed document exit tray 106 extends from side surface 102b, runs the width of printed document passageway 104, and is positioned adjacent the printed document exit 104a. A paper passageway 108 is defined by the chassis 100 and includes a paper entrance 108a positioned on the upper surface 102a of chassis 100. Paper passageway 108 and printed document passageway 104 are defined by the chassis 100 such that the paper passageway 108 and printed document passageway 104 are connected, which provides a passageway from paper entrance 108a, through the chassis 100, to printed document exit 104a. A convention printing device 110 is mounted to the chassis 100 and positioned adjacent paper passageway 108 and printed document passageway 104 and is operable to accept paper from the paper passageway 108, print on the paper, and feed the paper through the printed document passageway 104 on onto printed document exit tray 106. A conventional copying device 112 is positioned on the upper surface 102a of chassis 100 and adjacent the paper entrance 108a. A plurality of hinge members 114a and 114b are positioned on an end of the chassis 100 and in a spaced apart relationship from each other. In an embodiment, the printed document exit tray 106 is detachable from the chassis 100. In an embodiment, the printed document exit tray 106 is pivotally attached to the chassis 100. In an embodiment, the printing device 110 is coupled to an information handling system such as, for example, the information handling system 10 described above with reference to FIG. 1. In an embodiment, the printing device is wirelessly coupled to an information handling system such as, for example, the information handling system 10 described above with reference to FIG. 1.

Figure 3A:
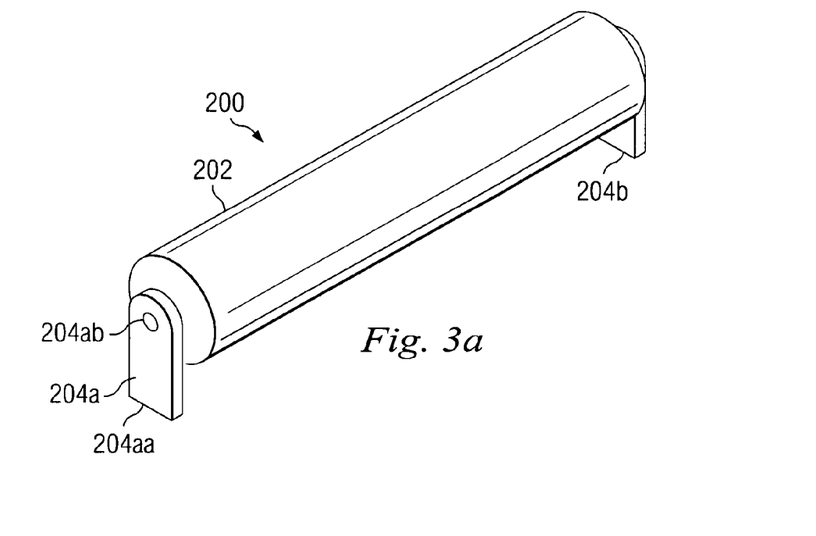
FIG. 3a is a perspective view illustrating an exemplary embodiment of a feed mechanism.
Figure 3B:
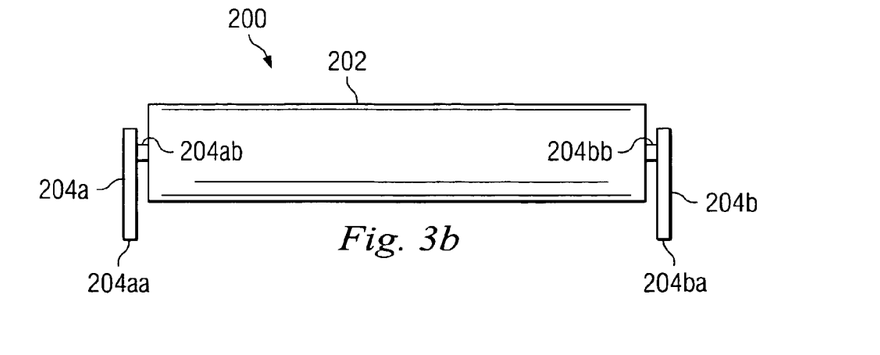

Referring now to FIGS. 3a and 3b, a feed mechanism 200 includes an elongated cylindrical member 202 rotatably coupled to a plurality of mounting brackets 204a and 204b. Mounting bracket 204a includes a mounting surface 204aa on a distal end and a rotational coupling 204ab which couples the mounting bracket 204a to the elongated cylindrical member 202 and allows the rotation of the elongated cylindrical member 202 about the rotational coupling 204ab. Mounting bracket 204b includes a mounting surface 204ba on a distal end and a rotational coupling 204bb which couples the mounting bracket 204b to the elongated cylindrical member 202 and allows the rotation of the elongated cylindrical member 202 about the rotational coupling 204bb. In an embodiment, a variety of conventional feed mechanisms known in the art may be employed in place of feed mechanism 200 without departing from the scope of the disclosed embodiments.

Figure 4A:
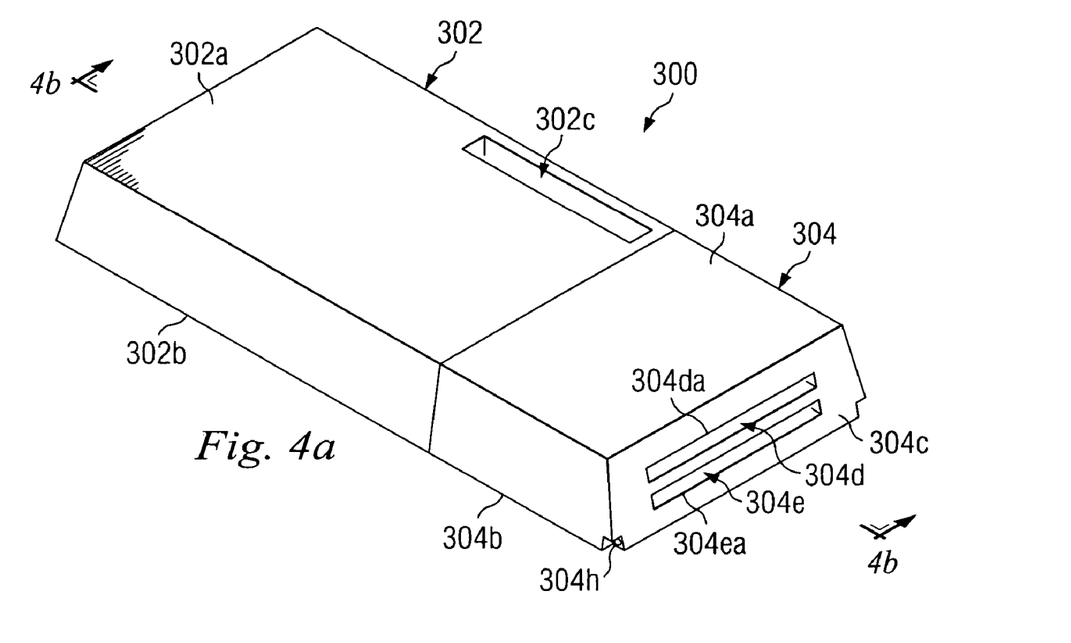
FIG. 4a is a perspective view illustrating an exemplary embodiment of a top cover including a stationary component and a servicing component.
Figure 4B:
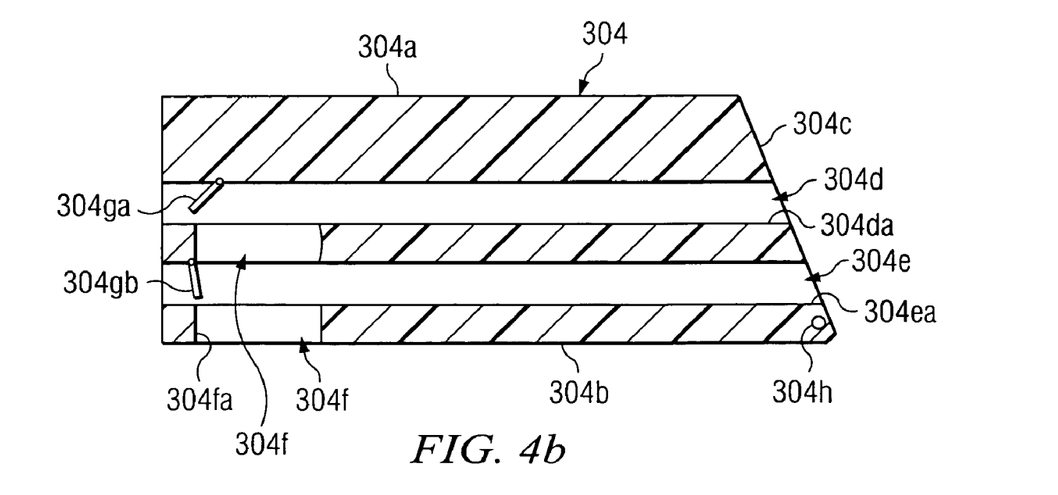
FIG. 4b is a cross sectional view illustrating an exemplary embodiment of the servicing component of FIG. 4a taken along line 4b.

Referring now to FIGS. 4a and 4b, a top cover 300 includes a stationary component 302 and a servicing component 304. Stationary component 302 includes a substantially level upper surface 302a and a bottom surface 302b positioned opposite the upper surface 302a. A paper entrance passageway 302c is defined by the stationary component 302 and extends from the upper surface 302a, through the stationary component 302, and to the bottom surface 302b. The servicing component 304 includes a substantially level upper surface 304a, a bottom surface 304b positioned opposite the upper surface 304a, and a side surface 304c extending between the upper surface 304a and the bottom surface 304b. A document entrance passageway 304d is defined by the servicing component 304 and is positioned substantially along the length of servicing component 304. A document entrance 304da is positioned on the side surface 304c and provides access to document entrance passageway 304d. A document exit passageway 304e is defined by the servicing component 304 and is positioned substantially along the length of servicing component 304 and adjacent document entrance passageway 304d. A document exit 304ea is positioned on the side surface 304c adjacent document entrance 304da and provides access to document exit passageway 304e. A feed mechanism passageway 304f is defined by the servicing component 304 and positioned adjacent to the document entrance passageway 304d and the document exit passageway 304e. A feed mechanism entrance 304fa is positioned on the bottom surface 304b of servicing component 304 and provides access to the feed mechanism passageway 304f. A guide beam 304ga extends from the servicing component 304 and into the document entrance passageway 304d adjacent the feed mechanism passageway 304f. A guide beam 304gb extends from the servicing component 304 and into the document exit passageway 304e adjacent the feed mechanism passageway 304f. A hinge coupling 304h is positioned on a corner of servicing component 304 adjacent the bottom surface 304b, the side surface 304, and the document exit passageway 304e. Stationary component 302 and servicing component 304 are designed such that, when positioned adjacent to each other, upper surface 302a on stationary component 302 and upper surface 304a on servicing component 304 provide a substantially level and planar upper surface on top cover 300. In an embodiment, the guide beams 304ga and 304gb are pivotally attached to the servicing component 304 and may be pivoted to allow access to document entrance passageway 304d and document exit passageway 304e.

Figure 5:
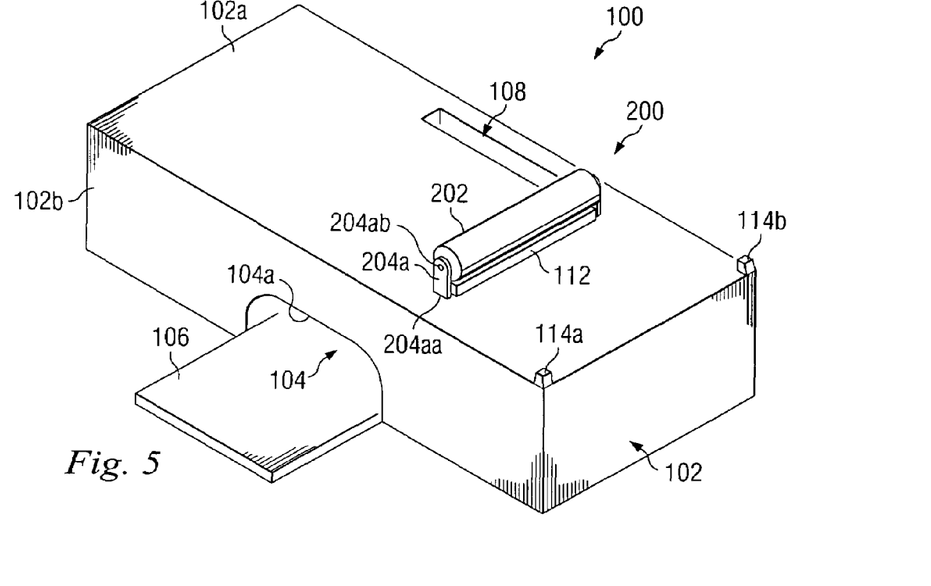
Figure 6A:
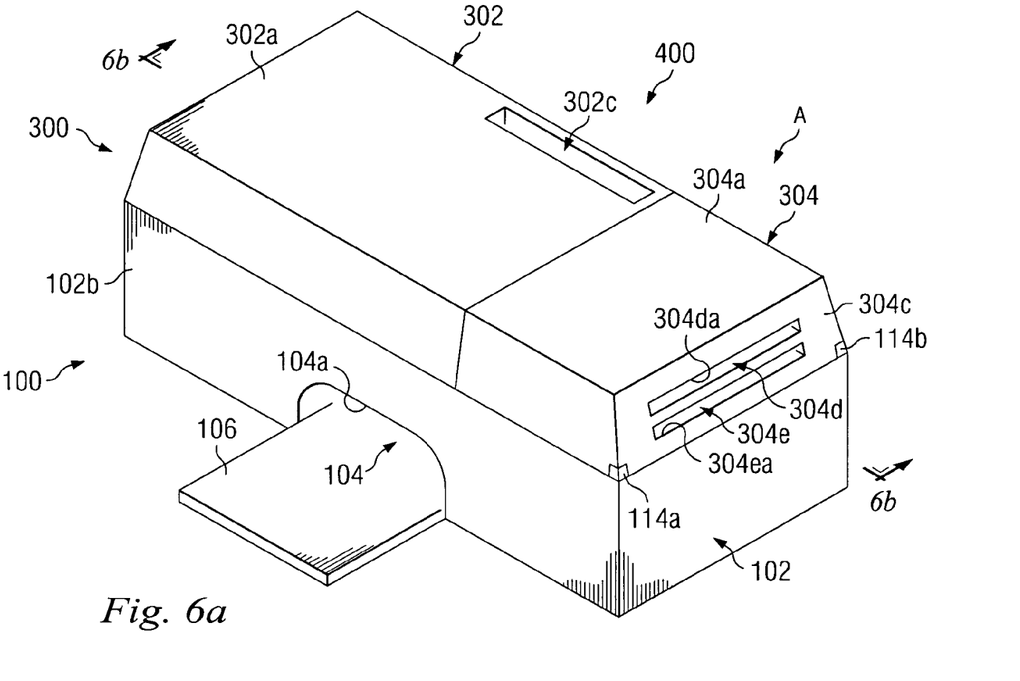
FIG. 6a is a perspective view illustrating an exemplary embodiment of the assembly of the chassis of FIG. 2a, the feed mechanism of FIG. 3a, and the top cover of FIG. 4a, providing a document feeding apparatus.
Figure 6B:
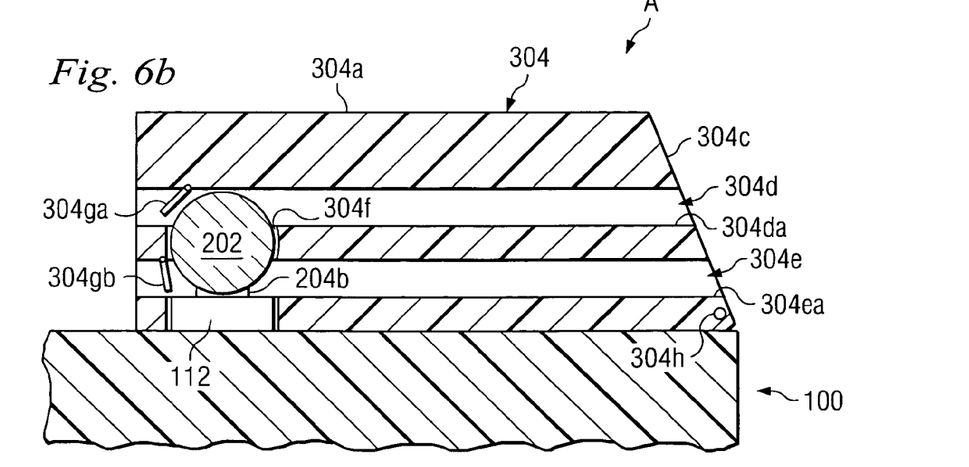
FIG. 6b is a cross sectional view illustrating an exemplary embodiment of the assembly of the chassis of FIG. 2a, the feed mechanism of FIG. 3a, and the top cover of FIG. 4a taken along line 6b.

Referring now to FIG. 5, in assembly operation, the feed mechanism 200 is mounted to the chassis 100. Elongated cylindrical member 202 is positioned over copying device 112 on upper surface 102a with mounting brackets 204a and 204b positioned on opposite sides of copying device 112. Mounting surface 204aa on mounting bracket 204a and mounting surface 204ba on mounting bracket 204b are then mounted to the upper surface 102a on chassis 100 using conventional methods known in the art. Elongated cylindrical member 202 may then be coupled to a motor which is coupled to an information handling system such as, for example, the information handling system 10 described above with reference to FIG. 1, in order to allow the elongated cylindrical member 202 to be rotated about rotational coupler 204ab.

Referring now to FIGS. 2a, 2b, 4b, 6a and 6b, the top cover 300 is coupled to the chassis 100. Bottom surface 302b on stationary component 302 is positioned over upper surface 102a on chassis 100 such that paper entrance passageway 302c on stationary component 302 substantially lines up with paper passageway 108 on chassis 100. Bottom surface 302b on stationary component 302 is then coupled to upper surface 102a on chassis 100 using conventional methods known in the art. With bottom surface 302b coupled to upper surface 102a, top cover 200 and chassis 100 provide a passageway from the upper surface 302a of stationary component 302, through paper entrance passageway 302c and paper passageway 108, and to printing device 110. Servicing component 304 is pivotally coupled to chassis 100 by coupling hinge coupling 304h on servicing component 304 to hinge members 114a and 114b on chassis 100. With servicing component 304 pivotally coupled to chassis 100, servicing component 304 provides a position A in which both elongated cylindrical member 202 on feed mechanism 200 and copying device 112 extend through feed mechanism entrance 304fa and into feed mechanism passageway 304f. Additionally, with servicing component 304 in position A, top cover 300 provides a substantially level and planar upper surface above chassis 100, with servicing component 304 and stationary component 302 in a substantially flush engagement along their adjacent edges. Furthermore, with servicing component 304 in position A, servicing component 304 provides protection for feed mechanism 200 and copying device 112 from foreign objects. The assembly of chassis 100, feed mechanism 200, and top cover 300 provides a document feeding apparatus 400 operable to feed documents to a device, such as, for example, the printing device 112. In an embodiment, top cover 300 may be integrated with chassis 100, providing a chassis 100 with a document entrance passageway 304d, a document exit passageway 304e, a paper entrance passageway 302c, and a substantially level top surface. In an embodiment, servicing component 304 may be detachably coupled to the chassis 100 rather than pivotally coupled, allowing the removal of servicing component 302 from the chassis 100.

Figure 7A:
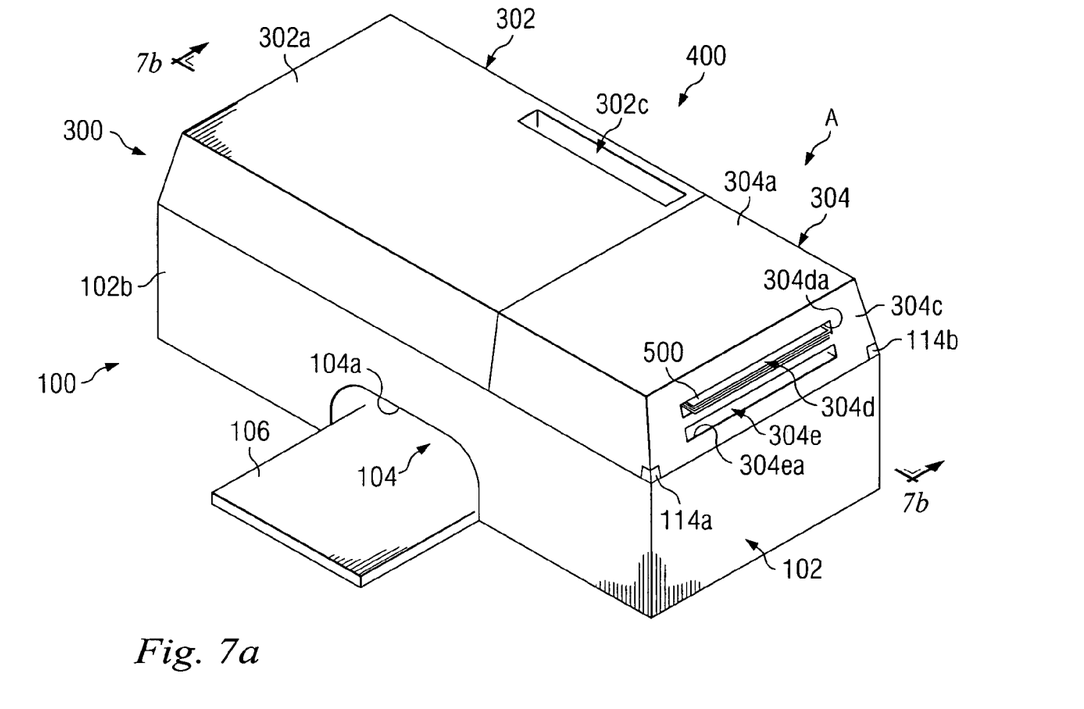
Figure 7B:
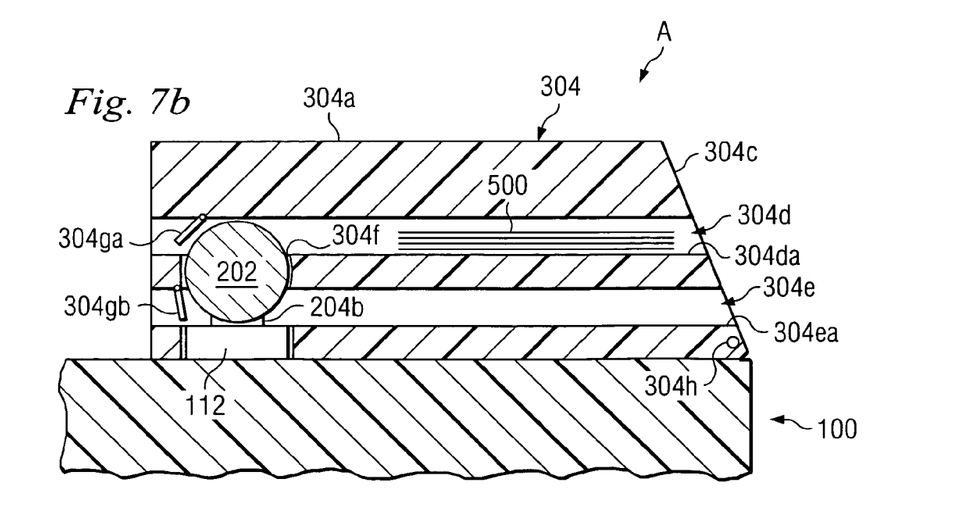
FIG. 7b is a cross sectional view illustrating an exemplary embodiment of the plurality of documents in the document feeding apparatus of FIG. 7a taken along line 7b.

Referring now to FIGS. 7a and 7b, in operation, a plurality of documents 500 may be positioned in the document entrance passageway 304d on document feeding apparatus 400. A conventional pick and feed mechanism may be provided with feed mechanism 200 in order to engage one of the plurality of documents 500 in order to transport the documents 500 to the copying device 200 and through to document exit passageway 304e. Guide members 304ga and 304gb may provide help in transporting the documents 500 by guiding the documents 500 from the paper entrance passageway 304d, through the feed mechanism passageway 304f, and to the copying device 112 and to the paper exit passageway 304e. During the transport of the documents 500 past the copying device 112, information on the documents 500 may be converted to a digital format. In an embodiment, paper may be provided in the paper entrance passageway 302c for use by the printing device 110. The printing device 110 may then receive the documents 500 in digital format from the copying device 112 through the information handling system 10 and print to the paper.

Figure 8:
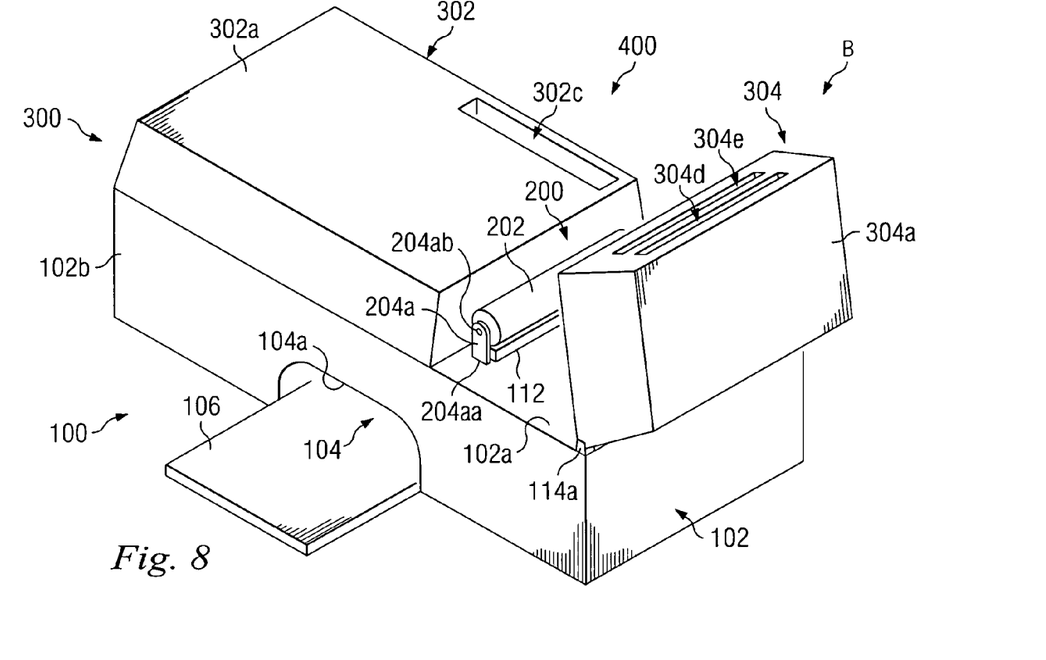
FIG. 8 is a perspective view illustrating an exemplary embodiment of the document feeding apparatus of FIG. 6a with the servicing component in an open position.

Referring now to FIG. 8, the servicing component 304 on top cover 300 may be pivoted about the hinge members 114a and 114b on chassis 100 into a position B. Pivoting servicing component 304 into position B exposes and allows access to the feed mechanism 200 and the ends of document entrance passageway 304d and document exit passageway 304e that are not accessible when the servicing component 304 is in position A. As a result, malfunctions of apparatus 400 such as, for example, paper jams, may be corrected.

Figure 9:
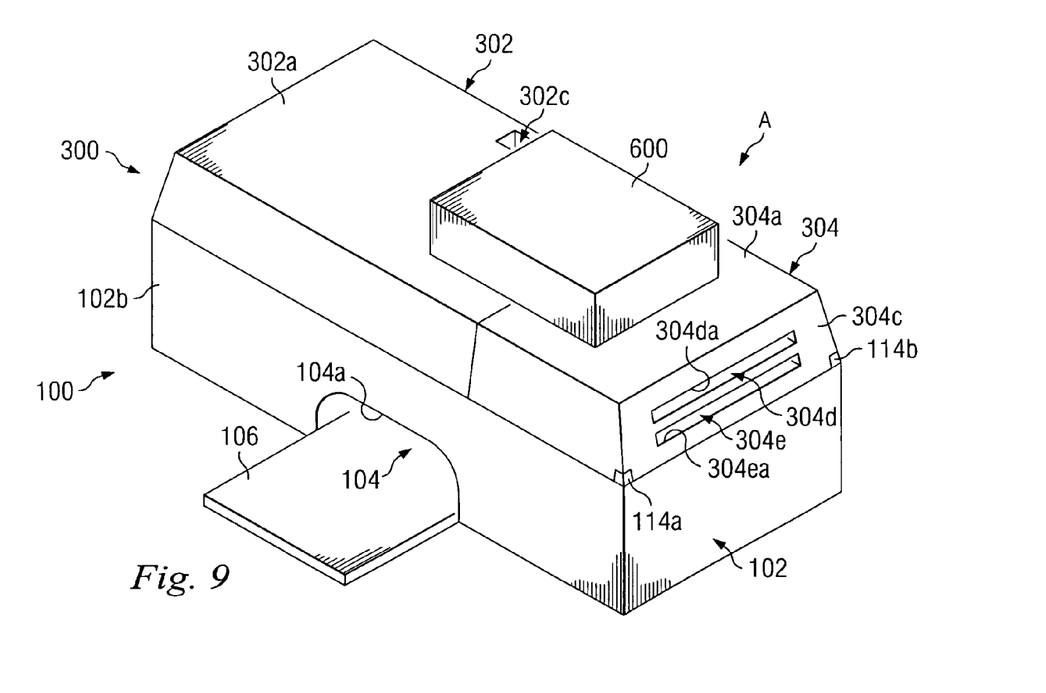
FIG. 9 is a perspective view illustrating an exemplary embodiment of the document feeding apparatus of FIG. 6a with a component positioned on the upper surface of the top cover.

Referring now to FIG. 9, with the servicing component 304 on document feeding apparatus 400 pivoted back to position A, a component 600 may be positioned on the substantially level and planar upper surface of top cover 300 which includes upper surface 302a on stationary component 302 and upper surface 304a on servicing component 304. Due to the positioning of document entrance 304da and document exit 304ea on side surface 304c of top cover 300, positioning of component 600 on top cover 300 does not interfere with the feeding of documents to the copying device 112. Furthermore, due to the substantially level upper surface 302a on stationary component 302 and the substantially level upper surface 304a on servicing component 304, top cover 300 provides a stable positioning location for component 600.

Figure 10A:
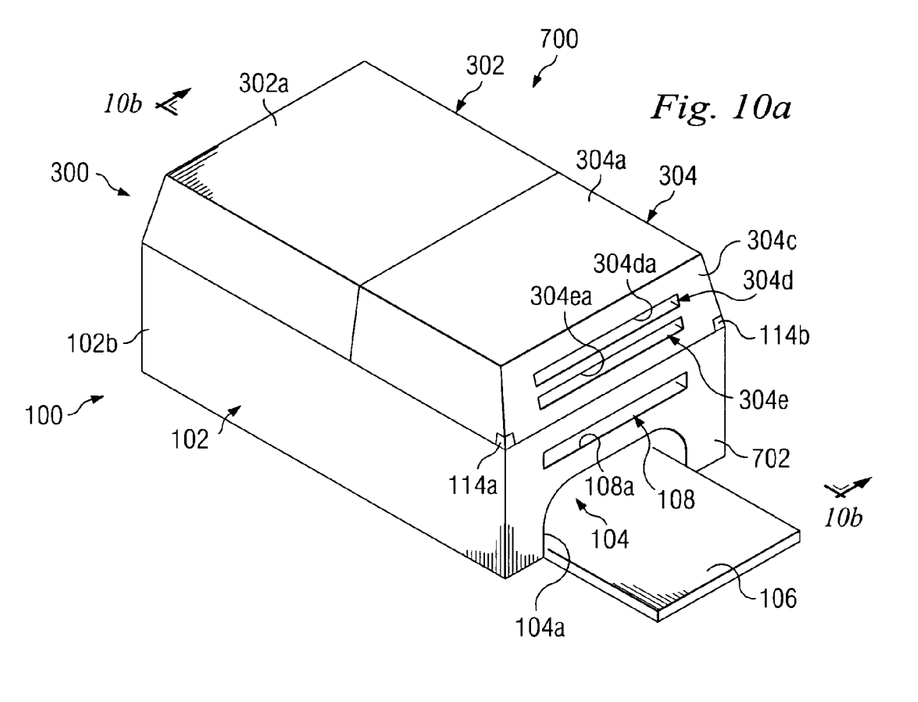
FIG. 10a is a perspective view illustrating an exemplary embodiment of a document feeding apparatus.
Figure 10B:
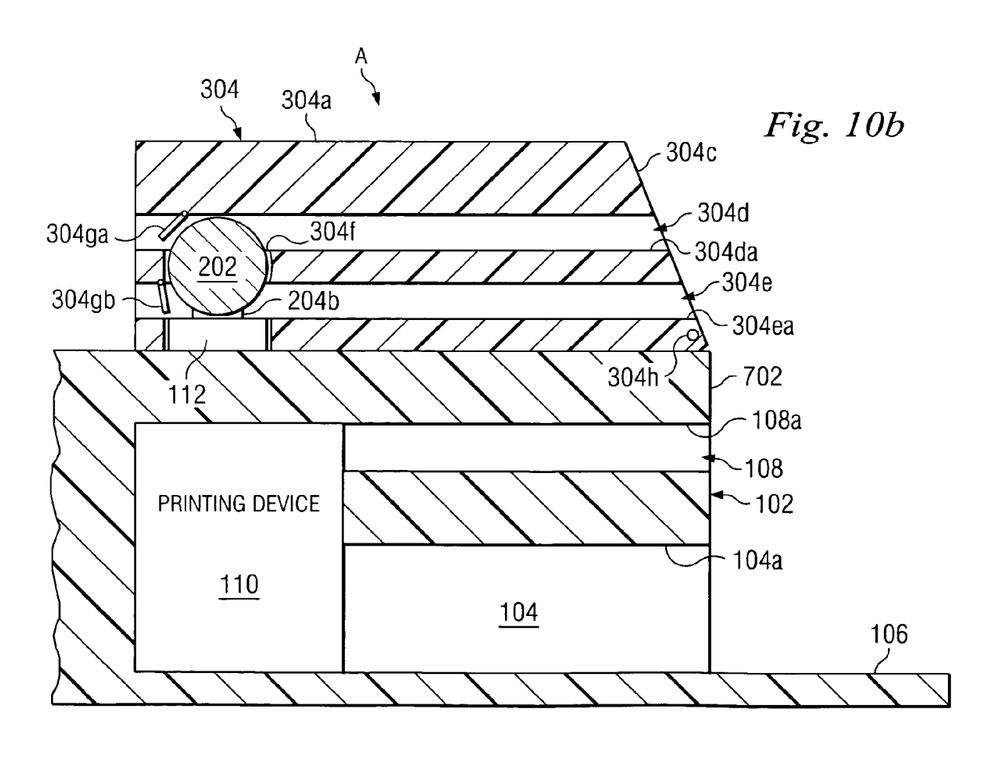

Referring now to FIGS. 10a and 10b, an alternative embodiment of a document feeding apparatus 700 is substantially similar in structure and operation to the document feeding apparatus 400 described above with reference to FIGS. 1, 2, 2a, 3a, 3b, 4, 4a, 5, 6, 6a, 7, 7a, 8, and 9, with a modification in the placement of the paper passageway 108, paper entrance 108a, printed document passageway 104, printed document exit 104a, and printed document exit tray 106, and the removal of the paper entrance passageway 302c on top cover 300. A side surface 702 is included on chassis 100 such that when top cover 300 is coupled to chassis 100, side surface 702 faces in substantially the same direction as side surface 304c on servicing member 304. Paper entrance 108a is positioned on side surface 702 and provides access to paper entrance passageway 108. Printed document exit 104a is positioned on side surface 702 and provides access to printed document passageway 104. Paper entrance passageway 108 continues to connect to printed document passageway 104 and provide access to printing device 110. Printed document exit tray 106 is mounted to side surface 702, along the length of printed document exit passageway 104a, and adjacent printed document exit 104a.

Figure 11:
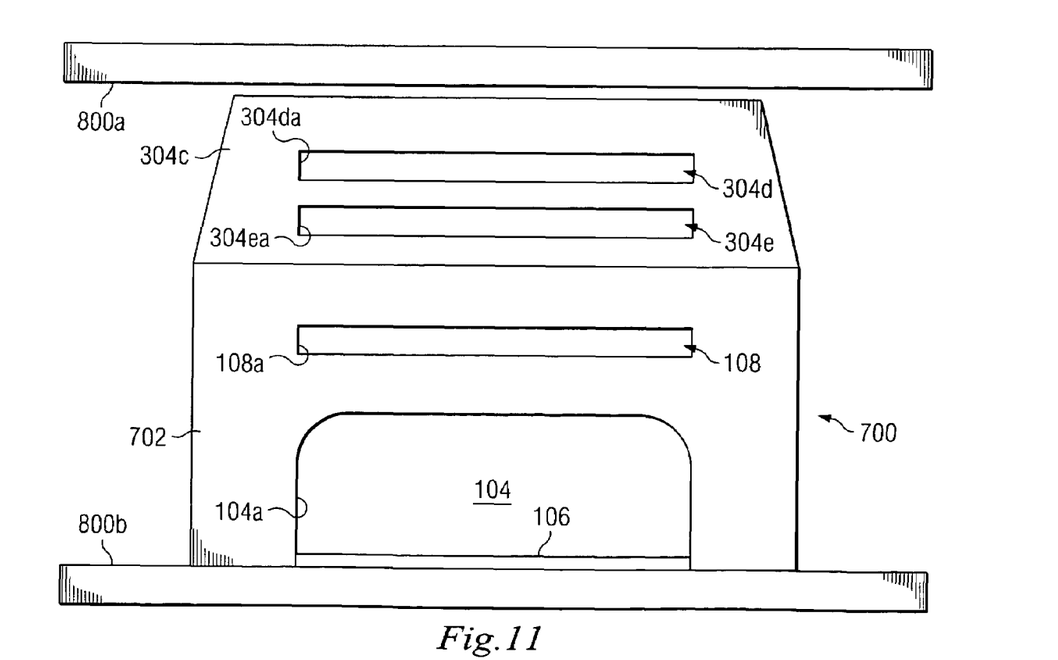
FIG. 11 is a front view illustrating an exemplary embodiment of the document feeding apparatus of FIG. 10a positioned in a restricted space.

Referring now to FIG. 11, in operation, a restricted space may be provided such as, for example, between a plurality of shelves 800a and 800b, which are substantially parallel and positioned in a spaced apart relationship. Document feeding apparatus 700 is positioned between the shelves 800a and 800b. Due to the positioning of document entrance 304da, document exit 304ea, paper entrance 108a, and printed document exit 104a, the printing and document feeding functions of the document feeding apparatus 700 may be utilized in the restricted space between shelves 800a and 800b. In an embodiment, with the printing device 112 wirelessly coupled to an information handling system such as, for example, the information handling system 10 described above with reference to FIG. 1, the document feeding apparatus 700 provides positioning options for the apparatus 700 without regard to access to the top of the apparatus 700.

It is understood that variations may be made in the foregoing without departing from the scope of the disclosed embodiments. Furthermore, the elements and teachings of the various illustrative embodiments may be combined in whole or in part some or all of the illustrated embodiments.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A document feeding apparatus comprising:
a chassis;
a top cover coupled to the chassis, wherein the chassis and top cover comprise a plurality of side surfaces and a substantially level upper surface;
a feed mechanism coupled to the chassis;
a substantially enclosed document entrance passageway located adjacent the feed mechanism and including a document entrance located on one of the plurality of side surfaces;
a substantially enclosed document exit passageway located adjacent the feed mechanism and including a document exit located on one of the plurality of side surfaces; and
a paper entrance and a printed document exit located on one of the plurality of side surfaces, wherein the document entrance passageway, the document exit passageway, the paper entrance, and the printed document exit all face the substantially same direction such that they are all accessible from a single side of the document feeding apparatus.

2. The apparatus of claim 1 further comprising:
a servicing component moveably coupled to the chassis, whereby moving the servicing component exposes the feed mechanism.

3. The apparatus of claim 2 wherein the servicing component is pivotally coupled to the chassis, whereby pivoting the servicing component exposes the feed mechanism.

4. The apparatus of claim 1 further comprising:
a copying device coupled to the chassis.

5. The apparatus of claim 4 wherein the copying device is located adjacent the feed mechanism.

6. The apparatus of claim 4 wherein the copying device is operable to convert documents to a digital format.

7. The apparatus of claim 1 further comprising:
a paper entrance passageway extending from the paper entrance to provide a path from the paper entrance to a printing device.

8. A printer comprising:
a chassis;
a top cover coupled to the chassis and including a plurality of side surfaces and a substantially level upper surface;
a servicing component moveably coupled to the chassis;
a feed mechanism located on the chassis and adjacent the top cover;
a document entrance passageway defined by the top cover and located adjacent the feed mechanism, the document entrance passageway including a document entrance located on one of the plurality of side surfaces;
a document exit passageway defined by the top cover and located adjacent the feed mechanism, the document exit passageway including a document exit located on one of the plurality of side surfaces; and
a paper entrance and a printed document exit located on the chassis, wherein the document entrance passageway, the document exit passageway, the paper entrance, and the printed document exit all face the substantially same direction such that they are all accessible from a single side of the printer.

9. The printer of claim 8 wherein the servicing component is pivotally coupled to the chassis.

10. The printer of claim 8 wherein the document entrance passageway is substantially enclosed by the top cover.

11. The printer of claim 8 wherein the document exit passageway is substantially enclosed by the top cover.

12. The printer of claim 8 further comprising:
a copying device located on the chassis.

13. The printer of claim 12 wherein the copying device is located adjacent the feed mechanism.

14. The printer of claim 13 wherein the copying device is operable to convert documents to a digital format.

15. The device of claim 8 further comprising:
a paper entrance passageway extending from the paper entrance to provide a path from the paper entrance to a printing device.

16. An information handling system comprising:
a microprocessor; and
a printer coupled to the microprocessor, the printer comprising:
a chassis;
a top cover comprising a plurality of side surfaces and a substantially level upper surface, wherein the top cover includes a servicing component pivotally coupled to the chassis;
a feed mechanism located on the chassis and adjacent the top cover;
a document entrance passageway defined by and substantially enclosed by the top cover and located adjacent the feed mechanism, the document entrance passageway including a document entrance on one of the plurality of side surfaces;
a document exit passageway defined by and substantially enclosed by the top cover and located adjacent the feed mechanism, the document exit passageway including a document exit on one of the plurality of side surface; and
a paper entrance and a printed document exit located on the chassis, wherein the document entrance passageway, the document exit passageway, the paper entrance, and the printed document exit all face the substantially same direction such that they are all accessible from a single side of the printer.

17. The system of claim 16 further comprising:
a copying device located on the chassis.

18. The system of claim 17 wherein the copying device is operable to convert documents to a digital format for storing in the information handling system.

19. The system of claim 17 wherein the copying device is located adjacent the feed mechanism.

20. The system of claim 16 further comprising:
a paper entrance passageway extending from the paper entrance to provide a path from the paper entrance to a printing device.

21. A printer comprising:
a document feeding apparatus having a plurality of external surfaces including a planar top surface;
a feed mechanism located on the document feeding apparatus;
a document entrance located on one of the surfaces other than the planar top surface;
a document entrance passageway extending from the document entrance to the feed mechanism and having a width substantially equivalent to the document entrance;
a document exit located on one of the surfaces other than the planar top surface;
a document exit passageway extending from the feed mechanism to the document exit and having a width substantially equivalent to the document exit; and
a paper entrance and a printed document exit located on one of the surfaces other than the planar top surface, wherein the document entrance passageway, the document exit passageway, the paper entrance, and the printed document exit all face the substantially same direction such that they are all accessible from a single side of the printer.

22. A method of feeding a document to a device comprising:
providing a document feeding apparatus including a plurality of side surfaces and a substantially level upper surface;
feeding a document to a copying device through a document entrance located on any one of the plurality of side surfaces;
retrieving the document through a document exit located on any one of the plurality of sides surfaces;
providing paper through a paper entrance located on any one of the plurality of side surfaces; and
retrieving a printed document through a printed document exit located on any one of the plurality of side surfaces, wherein the document entrance passageway, the document exit passageway, the paper entrance, and the printed document exit all face the substantially same direction such that they are all accessible from a single side of the document feeding apparatus.

23. The method of claim 22 further providing:
positioning a component on the substantially level upper surface.

24. The method of claim 22 further providing:
positioning the chassis in a restricted space.

* * * * *

UNITED STATES PATENT AND TRADEMARK OFFICE
CERTIFICATE OF CORRECTION

| | |
|---|---|
| PATENT NO. | : 7,365,886 B2 |
| APPLICATION NO. | : 11/020807 |
| DATED | : April 29, 2008 |
| INVENTOR(S) | : Charles G. Morton, III et al. |

It is certified that error appears in the above-identified patent and that said Letters Patent is hereby corrected as shown below:

Claim 16, Column 8, Line 63 delete "surface" and insert --surfaces--.

Signed and Sealed this

Eighteenth Day of November, 2008

JON W. DUDAS
*Director of the United States Patent and Trademark Office*